March 3, 1959 C. E. THORP ET AL 2,876,188
OZONE MANUFACTURE
Filed March 21, 1955 2 Sheets-Sheet 1

INVENTORS
CLARK E. THORP
LAYTON C. KINNEY
ALLAN J. GAYNOR
BY Robert W. Ely
ATTORNEY

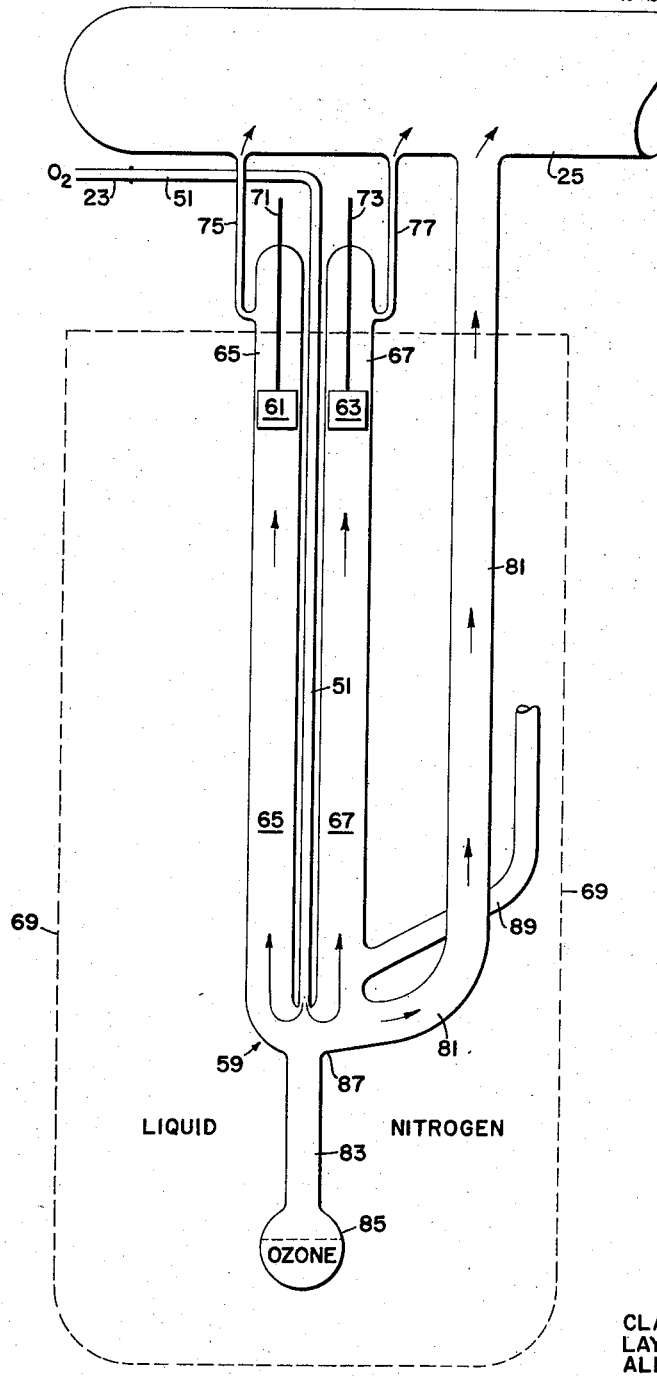

United States Patent Office 2,876,188
Patented Mar. 3, 1959

2,876,188

OZONE MANUFACTURE

Clark E. Thorp, Arlington Heights, Layton C. Kinney, Chicago, and Allan J. Gaynor, Skokie, Ill., assignors, by mesne assignments, to Air Reduction Company, Incorporated, New York, N. Y., a corporation of New York Application March 21, 1955, Serial No. 495,689

6 Claims. (Cl. 204—176)

This invention relates to the production of ozone from oxygen and more particularly concerns the use of a glow-type electrical discharge in such production.

It has long been known that ozone has many potentially important uses, such as a water purifying agent or as an oxidizer in chemical reactions. The fact that ozone has not been more extensively used is due in large part to the unit cost of manufacturing ozone. A basic factor in this cost is the low electrical power efficiencies which are obtained with known ozone manufacturing processes. The heat of formation of ozone is −34.4 kg. cal. per mole or .04 kw. hours per mole, but all known ozonizers have required five to twenty times this amount of energy to produce one mole of ozone. In addition to low efficiency, high concentration ozone presents an additional problem in that power costs increase rapidly with slight increases in ozone concentration. For instance, it is believed that conventional electrostatic ozonizers operate at an efficiency not exceeding 10 percent at an ozone concentration of one weight percent and not exceeding 4 percent at an ozone concentration of 6 weight percent, and that electrolytic processes have not exceeded 20 percent efficiency at a maximum ozone concentration of 18 percent by weight.

It is the primary object of the instant invention to provide an improved method and apparatus for the production of ozone from oxygen.

Another object is to provide means for producing liquid ozone from commercially-available oxygen.

A further object is to produce ozone at a much higher electrical power efficiency than has been previously possible.

The accomplishment of the above objects and others, along with features and advantages of the invention, will be apparent from the following description and the accompanying drawing in which:

Fig. 3 is a showing of an ozonizer substantially the same as shown in Fig. 2, but in the former design of ozonizer the oxygen is fed to the bottom of the U-tube.

In its broad aspects, the instant invention involves continually introducing oxygen at subatmospheric pressure into a glow-type electrical discharge ozonizer, converting oxygen to ozone by such a discharge, and condensing the ozone on very cold ozonizer surfaces very rapidly after the ozone is formed. The preferred operating conditions are such as to provide an optimum electron density in relation to the quantity of molecules of oxygen flowing through or into the ozonizer, an optimum oxygen density or gaseous mean free path and an optimum temperature. The preferred ozonizer includes a small-diameter U-tube which is immersed in a quantity of liquid nitrogen. The U-tube has electrodes at the top of each leg and is constructed to permit the flow of a gas therethrough and to provide for the suitable collection of liquid ozone.

Figure 1:
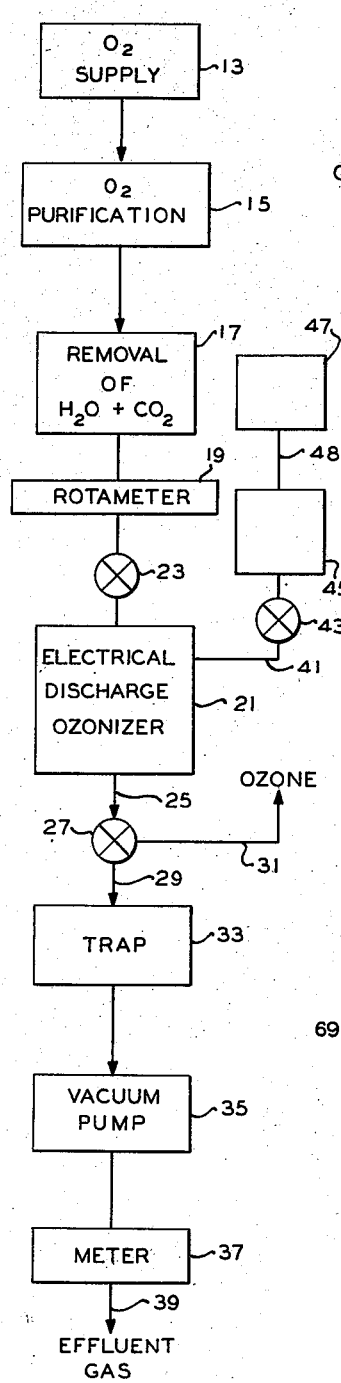
Fig. 1 is a flow sheet of the preferred form of the instant process.

Referring to the Fig. 1 flow chart, the oxygen supply 13 represents a source of oxygen, such as commercial oxygen cylinders. This supply is connected to an oxygen purification device 15, such as a combustion tube furnace which is originally packed with 12 gauge, pure copper elements. The flow path next includes a trap 17 containing liquid oxygen for the removal of any carbon dioxide and water, resulting from the purification in device 15. A rotameter 19 is connected to trap 17. The ozonizer 21 which converts oxygen to ozone receives oxygen from the rotameter 19 through a valved conduit 23. The outlet of the ozonizer 21 is connected to conduit 25 which extends to a suitable valve 27 which is manipulated to provide communication with the conduit 29 in the normal flow path or with conduit 31 which serves for a purpose to be explained hereinafter. Conduit 29 connects to a trap 33 containing liquid nitrogen. The remaining two items in the flow path are a vacuum pump 35 and a meter 37 for measuring the effluent gas from the ozonizer. A conduit 39 is connected to the outlet of meter 37 and serves to pass the effluent gas from the ozonizer to suitable oxygen recovery means (not shown) or other devices.

The flow chart also shows the means for determining the pressure in the ozonizer 21. This means includes conduit 41 having valve 43, a combustion tube furnace 45 and a pressure measuring device 47 which is connected to the furnace 45 by means of conduit 48.

Figure 2:
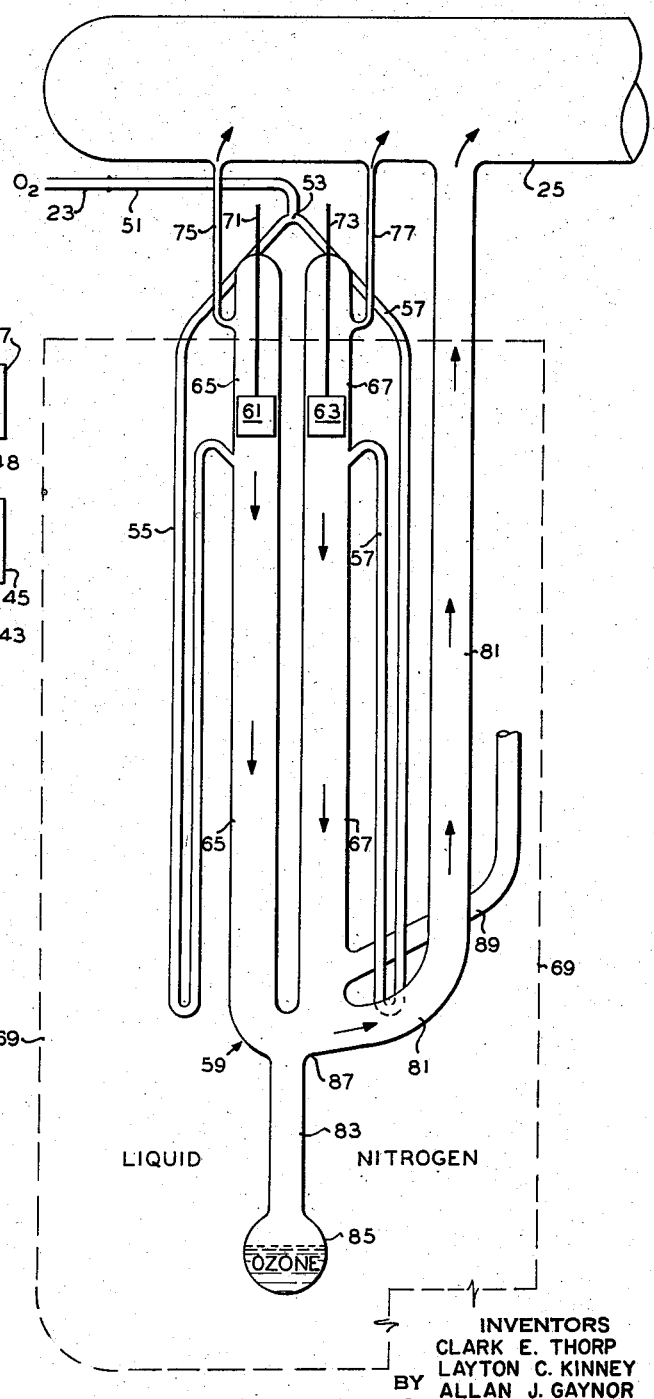
Fig. 2 is a showing of the preferred ozonizer incorporating a U-tube which is immersed in the liquid nitrogen bath.

In Fig. 2 the details of the ozonizer 21, which includes a U-tube, are shown. The conduit 23 (leading from the rotameter 19 shown in Fig. 1) is connected to the inlet tubing 51 of the ozonizer. This tubing 51 branches at 53 and then joins two dip loops 55, 57 which connect to the U-tube 59 at locations just below the electrodes 61, 63 in the tops of each leg 65, 67 of the U-tube. The dip loops 55, 57 serve to move the incoming oxygen into a cooling indirect heat exchange with the liquid nitrogen in container 69, which is represented by dashed lines in the interests of clarity, and also serve to prevent electrical short circuit of the ozonizer which would occur if the oxygen inlets were joined to a short uncooled common oxygen source. Any suitably insulated container, such as a Dewar flask, can be used for the liquid nitrogen.

The electrodes 61, 63 are made from commercially-available, high purity aluminum. The annular space between the side of the electrodes and the interior surfaces of the adjacent portions of the legs 65, 67 is about 0.001 of an inch in width. The electrodes are supplied electricity, by tungsten leads 71, 73, from a neon-sign type of transformer (not shown) which is operated by 110 volt A. C. supply. Above the electrodes, two bleed-offs 75, 77, which provide for removal of heat from the electrodes, are connected to the upper part of the legs of the U-tube and extend to the conduit 25 leading to the vacuum pump above mentioned. The U-tube has a drain tube 81 for ozone connected to the bottom 87 of the U-tube and this drain tube or exit conduit empties into a bulb 85. A pressure tap conduit 89 is connected to the U-tube near the outlet 81 and extends to, and makes connection with, conduit 41 shown in Fig. 1.

The bleed-offs 75, 77 have an inside diameter of 0.5 millimeter. The inside diameter of tube 25 is 30 millimeters. The inside diameter of the U-tube legs 65, 67, the ozone exit conduit 81, and the tube 83 leading to bulb 35 from the bottom of the U-tube are, respectively, 9 millimeters, 8 millimeters, and 6 millimeters. The inside diameter of the pressure tap tube 89, which connects with conduit 41 shown in Fig. 1, is 5 millimeters. The inter-electrode distance is about 19 inches.

In operation, commercial-grade cylinder oxygen (99.6 percent pure) containing non-oxygen components, principally argon with some nitrogen, from supply 13 is passed through the furnace 15 which is operated at 1450° F. In the furnace, any trace of combustible hydrocarbon contaminants which may be in the oxygen are burned to water and carbon dioxide. The small amounts of water and carbon dioxide present in the oxygen are removed in the liquid oxygen trap 17 by being solidified. The purified gaseous oxygen is admitted, at a controlled rate by the valve in conduit 23, to the previously evacuated ozonizer through the calibrated rotameter 19. A glow-type discharge is then initiated in the ozonizer 21 between the electrodes 61, 63. The ozonizer has been previously cooled with liquid nitrogen. The refrigerant level is maintained at a level one-quarter inch below the bottom level of the electrodes during the entire run. Liquid ozone immediately condenses on the walls of the U-tube and drains into the bulb or reservoir 85. The effluent gas, including the 0.4 percent of other components, from the ozonizer flows through outlet 81 and conduit 25 to the downstream trap device 33 which is comprised of two traps filled with glass wool and refrigerated at a temperature of −196° C. by liquid nitrogen. This effluent then passes through the vacuum pump 35 and the meter means 37 which is a wet gas meter. From meter 37 the residual effluent is passed through conduit 39 to recovery means (not shown) or otherwise disposed of.

For determining the pressure adjacent the outlet of the ozonizer the gas is passed through pressure tap 89, conduit 41, and valve or stopcock 43 to the combustion tube furnace 45 (shown in Fig. 1) which is packed with pure copper wire and is operated at 1200° F. This furnace is installed as a safety device, serving the dual purpose of preventing contamination of the system by the pressure measuring device 47 and of preventing small amounts of ozone from reaching the sensing element of the pressure gauge. The pressure gauge which is preferred is a commercial item which operates due to the ionization of gas molecules by radium and the resulting ion current which is directly proportional to the number of ions collected in a given time. The presence of synthetic rubber (neoprene) in the sensing element of the pressure gauge necessitated the use of the furnace 45. It had been planned to determine pressures at several points during all runs; however, since initial runs showed a maximum pressure drop of only 0.04 millimeter of mercury from the inlet to the discharge end of each tube which was tested, the other pressure taps (not shown) were not used.

The furnace 45 is typical of safety measures incorporated in the entire system. Extreme precautions must be taken to prevent even a trace of combustible hydrocarbons from contaminating the ozone, since such contamination might cause detonation of the ozone.

During operation, it is apparent that a very small flow of oxygen will move up past the electrodes 61, 63 and out of the U-tube through bleed offs 75, 77 which are of such construction (diameter and length) as to prevent electrical discharge therethrough between electrodes. By this arrangement, it is apparent that a small portion of the gases will flow past the electrodes, thus removing heat. It is to be noted that the electrodes are removed from the region where they could affect the ozone draining down the walls of the discharge vessel and that the maximum average distance for an ozone molecule to travel to get to a very cold surface is of the order of 4.5 mm. A very important related feature is the very low temperature of the U-tube walls which is provided by the liquid nitrogen bath at −196° C. This is significant because it serves to cause the removal of the ozone from the reaction and also it prevents decomposition of ozone by electrons. It is noteworthy that at the boiling point temperature of liquid air (about −191° C.) the vapor pressure of ozone has been determined to be about 0.015 mm. Hg while at the boiling point temperature of liquid nitrogen (−196° C.), the corresponding vapor pressure is about 0.0035 mm. Hg. With prevailing operating pressures, this factor is, of course, even more significant. It is considered essential for satisfactory operation that the refrigerant bath be below −193° C. and preferably at −196° C.

Since gaseous ozone is usually desired for commercial uses, the collected liquid ozone can be slowly evaporated by lowering, with suitable conventional means, the liquid nitrogen bath after the ozonizer's oxygen and electrical supplies are discontinued. In this manner, the liquid ozone is slowly evaporated and escapes in gaseous state via valved conduit 31 for use in chemical reactions or other operations. It is also possible to obtain the liquid ozone as such from the ozonizer by means of suitable conduits, valves, couplings, and containers, which can be connected to the ozone drain tube and would be suitably arranged with respect to the nitrogen container. The transfer apparatus must be such that explosive impurities, such as hydrocarbons, do not contaminate the ozone. With this arrangement, it is possible to continuously remove liquid ozone.

The electricity for effecting the discharge through the oxygen is derived from a current-limiting type of a transformer which is operated from a conventional 60 cycle, 110 volt supply. With the illustrated ozonizer in which the oxygen flows down each leg of the U-tube, it should be noted that the electrical discharge is used to full advantage since the more potent, ozone-producing part of the discharge alternates between electrodes in accordance with the alternating current. Electrical measurements were made by a circuit which included a voltage divider and voltmeter for measuring the average secondary volts of the 10,000 volt neon sign transformer which is an un-enclosed core and coil type immersed in mineral oil. Peak voltages were measured by means of an electrostatic voltmeter. The secondary current was measured by a milliammeter and the secondary watts was obtained by multiplying secondary current by the average secondary volts and using a power factor equal to unity.

Percent power efficiency was calculated as follows:

Percent power efficiency =
$$\frac{0.835 \times \text{ozone production rate (g./hr.)} \times 100}{\text{Secondary watts}}$$

The value of 0.835 watt has been determined as the theoretical energy necessary to form one gram of ozone, based on 100 percent conversion of electrical energy for supplying the 34.4 K cal. per mole for ozone formation.

The production rate was calculated by assuming the difference between oxygen in and oxygen out to be ozone. The ozone condensed per unit time in other similar tests was measured by the liquid level rise in a calibrated tip or bulb at the bottom of the U-tube and it was established that the measured quantity in the instant process was entirely ozone and was equivalent to the difference between the input and output of oxygen, as converted to ozone. Gas conversion was calculated in the following manner:

$$\frac{O_2 \text{ in} - O_2 \text{ out}}{O_2 \text{ in}} \times 100 = \text{percent gas conversion}$$

Data and results, based on the above calculations and obtained during the operation of the disclosed preferred ozonization system shown in Figs. 1 and 2, are presented in the following table:

Table I

| Run No. | Pri. Volts | Sec. Volts, Average | Sec. Volts, ESVM | Sec. I (ma.) | O₂ Flow (cc./min.) | Percent P. E. | Percent Gas Conv. | Pressure (mm. Hg) | O₃ Production (gm./hr.) | Sec. Volt Amps. | O₃ Volume Out (liters/hr.) |
|---|---|---|---|---|---|---|---|---|---|---|---|
| 1 | 30 | 885 | 1,980 | 2.9 | 23.5 | 37.4 | 59.7 | 0.23 | 1.18 | 2.56 | .586 |
| 2 | 30 | 829 | 1,830 | 3.3 | 13.8 | 22.95 | 64.8 | 0.125 | 0.752 | 2.735 | .302 |
| 3 | 30 | 985 | 2,080 | 2.4 | 2.6 | 7.8 | 100 | 0.054 | 0.223 | 2.36 | (¹) |
| 4 | 35 | 1,075 | 2,320 | 3.3 | 48.5 | 50.5 | 52.8 | .395 | 2.15 | 3.55 | 1.4 |
| 5 | 37 | 1,010 | 2,310 | 3.8 | 53.5 | 47.4 | 52.2 | .45 | 2.39 | 4.21 | 1.54 |
| 6 | 39.5 | 1,210 | 2,500 | 3.9 | 68.5 | 52 | 50.2 | .53 | 2.94 | 4.72 | 2.05 |
| 7 | 39.5 | 1,210 | 2,550 | 3.9 | 68.5 | 52.3 | 50.4 | .58 | 2.96 | 4.72 | 2.04 |
| 8 | 40 | 1,165 | 2,490 | 4.1 | 68.5 | 53.1 | 52.8 | .50 | 3.04 | 4.78 | 1.98 |
| 9 | 40 | 1,175 | 2,490 | 4.1 | 68.5 | 50.4 | 49.7 | .50 | 2.91 | 7.82 | 2.07 |
| 10 | 42 | 1,310 | 2,680 | 4.3 | 83.5 | 48.5 | 45.8 | .67 | 3.28 | 5.64 | 2.71 |
| 11 | 45 | 1,165 | 2,460 | 5.9 | 83.5 | 48.6 | 57.2 | .59 | 4.01 | 6.88 | 2.2 |
| 12 | 45 | 1,265 | 2,640 | 5.5 | 93.5 | 46.9 | 50.0 | .655 | 3.92 | 6.96 | 2.86 |
| 13 | 45 | 1,110 | 2,340 | 6.4 | 73.5 | 44.8 | 61.7 | .49 | 3.81 | 7.1 | 1.74 |
| 14 | 45 | 1,175 | 2,450 | 6.1 | 83.5 | 46.4 | 56.8 | .58 | 3.98 | 7.17 | 2.22 |
| 15 | 45 | 929 | 2,050 | 7.05 | 33.5 | 27.1 | 75.3 | .19 | 2.12 | 6.55 | .514 |
| 16 | 45 | 1,300 | 2,630 | 5.6 | 2.0 | 1.96 | 100 | .058 | 1.171 | 7.28 | (¹) |
| 17 | 45 | 1,290 | 2,630 | 5.3 | 93.5 | 48.4 | 50.6 | .67 | 3.97 | 6.84 | 2.83 |
| 18 | 48 | 1,545 | 3,050 | 4.6 | 123.5 | 48.9 | 39.3 | .97 | 4.16 | 7.1 | 4.5 |
| 19 | 50 | 1,120 | 2,400 | 7.5 | 83.5 | 45.2 | 63.6 | .535 | 4.55 | 8.4 | .38 |
| 20 | 50 | 1,558 | 3,040 | 5.3 | 138.5 | 49.6 | 42.1 | .984 | 4.9 | 8.25 | 4.88 |
| 21 | 50 | 1,531 | 3,030 | 5.3 | 133.5 | 50.2 | 43.6 | .935 | 4.88 | 8.13 | 4.59 |
| 22 | 50 | 1,531 | 3,050 | 5.3 | 133.5 | 51.9 | 45.1 | .88 | 5.06 | 8.13 | 4.47 |
| 23 | 50 | 1,120 | 2,390 | 7.3 | 83.5 | 43.7 | 61.2 | .515 | 4.29 | 8.16 | 1.99 |
| 24 | 50 | 1,540 | 3,050 | 5.3 | 135.5 | 49.7 | 41.7 | .96 | 4.85 | 8.15 | 4.74 |

¹ Not measurable.

Other tests were made with the primary volts varying between 52 and 60 volts. In general, somewhat higher average secondary currents, oxygen flows, and pressures resulted.

Because of the voltage-current relationships of the discharge tube, it is necessary to use the above-mentioned current-limiting type transformer. The secondary voltage output of this type of transformer is regulated in an inverse relation to its current capacity. If the primary input of such a transformer is set at different voltages as shown in the above table, a series of curves may be plotted from the secondary electrical characteristics at various pressures in the discharge tube. By reference to runs numbered 19 to 24 in the above table, it can be seen that the data, or a curve thereof, shows that the power efficiency rises to a maximum as pressure increases and then decreases somewhat with a further increase in pressure. The point at which the secondary current is at a minimum at high pressure is called the "break-off" point because the discharge cannot be maintained beyond this point. It has been determined, as by runs 19 to 24, that the highest electrical efficiencies occur adjacent this "break-off" point. It is apparent that this characteristic is a function of current density, i. e., ma./unit number of gas molecules. Thus, it was determined that, with below atmospheric pressure which is adjusted in relation to the amount of current to give a current density of between 6.0 and 8.5 milliamperes per millimeter mercury of pressure, very high electrical efficiencies are obtained. Runs numbered 4, 5, 7, 10, 17, and 22 are runs which were made quite adjacent the "break-off" point and it is apparent the quotients of the given secondary milliamperes divided by the given pressures (in mm. Hg) for these runs are within the range of 6.0 to 8.5.

From the above data, it is also apparent that the best power efficiencies are obtained when between a 40 to 60 percent gas conversion occurs.

From various tests, it was determined that the inside diameters of the U-tubes must be within the range of 5 to 12 millimeters or, stated differently, the opposed refrigerated wall segments of the conversion zone or chamber must be spaced between 5 and 12 millimeters apart. In a flattened U-tube, such as was tested, it is apparent that most of the opposed wall segments would be closely spaced, in the range above mentioned. This spacing feature, together with the low temperature provide for the rapid condensation of the ozone.

In another design of an ozonizer which worked satisfactorily, as shown in Fig. 3 of the drawing, the oxygen is fed to the bottom of the U-tube and then divides and flows up each leg of the U-tube. The residual gas is removed from the top of each leg by conduits which are connected to the top of the U-tube legs, above the electrodes. With this form of the apparatus, it is to be noted that the oxygen is introduced at the midpoint between electrodes and then is subjected to electrical discharge as it flows up each leg, rather than down each leg as is illustrated. The residual gases are caused to move past the electrodes and out of the U-tube through conduits by means of a vacuum pump. With this mode of operation, the residual gases tend to remove heat from the electrodes. The level of the liquid nitrogen bath was as previously described, as were all operating conditions and characteristics. It is also feasible to make ozone, in accordance with features of the instant invention, by using a U-tube in which the oxygen is admitted at the top of one leg and a vacuum pump is connected to the top of the other leg, but efficiencies will be somewhat lower.

In reference to the ozonizers herein disclosed, it is to be noted that the oxygen flow-through in the ozonizers prevents the accumulation of gases, such as argon and nitrogen, which will not be condensed under the operating conditions and so interference with the electrical discharge does not occur. The residual gases, after ozone formation, are removed by the flow means such as conduit 81, so that substantially pure liquid ozone is collected in bulb 85.

It can be stated that another material which has been found suitable for the electrodes is stainless steel.

It is to be noted that it is essential that the oxygen be purified by means such as the copper oxide furnace 15 and that the entire system does not contain any source of oxidizable materials. Thus, there is nothing in the oxygen, admitted to the ozonizer, which will trigger the decomposition of ozone and there is nothing in the system, such as rubber gaskets, which can contaminate the ozone.

It is also to be noted that the geometry of the U-tube is such that the ozone drains away from the electrodes.

In all ozonizers which were satisfactorily tested, it was apparent that for maximum efficiency the ozone must have an adequate condensing surface and must be refrigerated to at least −193° C. and preferably −196° C. In most cases, the walls of the U-tube were refrigerated by liquid nitrogen at −196° C. so that the ozone would be condensed rapidly after formed. The subatmospheric pressure in the ozoniers is of the order of less than 1 millimeter Hg absolute.

The space defined by the electrodes and the condensing surface can be referred to as a conversion zone.

The term, "glow-type discharge," as used herein, means the type of electrical discharge or flow of current in a gas which occurs in a neon sign or a fluorescent lamp. Glow discharges take place at low pressures (a few mm. of mercury), as is briefly described in the texts, such as Sears' "Principles of Physics" (1947). Of course, it is to be appreciated that, due to the conversion of oxygen to ozone, the instant ozonizers differ from the neon sign discharge devices.

As above suggested, it is to be understood that the elements of the entire flow path are so selected and constructed that there is substantially no possibility of oxidizable substances entering the system and reacting with the ozone. Thus, the part of the system which may contaminate the ozone is maintained absolutely free of hydrocarbon substances which will react with ozone. If a seal is needed, inert lubricants are required.

It is to be noted that the positive column of the electrical discharge which produces most of the ozone alternates with the alternating current and hence ozone is made in equal amounts in each leg when split-feeding is used.

Very important features of the above glow-type discharge process are the use of low temperature refrigeration and the wall spacing whereby it is possible to condense the ozone immediately after it is formed and hence the ozone-to-oxygen decomposition is prevented.

From the foregoing, it is apparent that it has been discovered that the maximum electrical efficiency occurs adjacent the "break-off" point, that is, the point at which the secondary current is at a minimum at relatively high pressure. The discharge cannot be maintained beyond this point. In the instant low pressure, low temperature glow-type discharge ozonizer, the "break-off" feature defines in the practical terms the preferred operational condition which is involved in the highly complicated conversion of oxygen to ozone. Thus, there are definite advantages in maintaining the quotient of the current in milliamperes divided by the unit number of oxygen molecules as indicated by the measurement of pressure in millimeters of mercury in the range of 6.5 to 8.

From the above description, it is also apparent that means have been provided for effecting the steps of, removing any non-oxygen components, such as argon and nitrogen, from the ozonization zone so that an effect on the electrical discharge will not result due to the concentration of argon, for instance, with the result that commercial-grade, high-purity oxygen as obtained by liquefaction and separation can be used. Also means have been provided for cooling the oxygen to be introduced, as shown in the illustrated ozonizer.

It is to be understood that this invention is not limited to the specific illustrative embodiment herein disclosed but includes such modifications as fall within the scope of the appended claims.

We claim:

1. The method of producing substantially pure ozone from oxygen which comprises the steps of introducing oxygen which is free of oxidizable substances into an ozonizer chamber having spaced electrodes and condensing wall surfaces surrounding each electrode, maintaining the absolute pressure in said ozonizer chamber at substantially less than atmospheric pressure, maintaining said wall surfaces at a temperature of less than $-193°$ C., subjecting said oxygen to an electrical glow discharge which is established between said electrodes whereby oxygen is converted to ozone, spacing at least two opposed walls of said surfaces at a distance sufficiently small to effect condensation of said ozone on said walls substantially instantaneously with the formation of said ozone, and collecting said ozone in substantially pure liquid form at a location which is removed from said electrodes.

2. The method according to claim 1 in which said opposed walls are spaced about five millimeters to twelve millimeters from each other.

3. The method according to claim 1 in which the absolute pressure in said ozonizer chamber is maintained at less than one millimeter mercury.

4. The method according to claim 3 in which said electrical glow discharge and quantity of said oxygen are regulated so that a current density of between 6.0 and 8.5 milliamperes per millimeter mercury of pressure results in said ozonizer, and said electrical discharge is operated near extinguishment point.

5. The method of producing substantially pure ozone from oxygen which comprises the steps of introducing hydrocarbon-free oxygen into an ozonizing chamber having spaced electrodes and opposed condensing wall surfaces surrounding each electrode and spaced between 5 and 12 millimeters from each other, maintaining the pressure in said chamber at less than one millimeter mercury, maintaining said wall surfaces at a temperature of less than $-193°$ C., subjecting said oxygen to an electrical glow discharge which is established between said electrodes whereby said oxygen is converted to gaseous ozone and said ozone is condensed immediately thereafter on said surfaces, regulating said electrical discharge and quantity of oxygen so that a current density of between 6.0 and 8.5 milliamperes per millimeter mercury of pressure results in said ozonizer chamber, removing any oxygen which is not converted to ozone and residual gases, and collecting the condensed ozone in substantially pure liquid form at a location which is removed from said electrodes.

6. The method according to claim 5 in which said surfaces are in contact with liquid nitrogen and said hydrocarbon-free oxygen is cooled by heat exchange with said liquid nitrogen.

References Cited in the file of this patent

UNITED STATES PATENTS

| 577,523 | Andersson et al. | Feb. 23, 1897 |
| 1,066,674 | Steynis | July 8, 1913 |
| 1,074,106 | Dumars | Sept. 30, 1913 |
| 2,700,648 | Thorp et al. | Jan. 25, 1955 |
| 2,704,274 | Allison | Mar. 15, 1955 |

FOREIGN PATENTS

| 390,408 | France | July 28 1908 |
| 124,752 | Great Britain | Mar. 24, 1919 |
| 140,777 | Great Britain | Jan. 6, 1921 |